(12) United States Patent
Burn

(10) Patent No.: US 8,545,140 B2
(45) Date of Patent: Oct. 1, 2013

(54) DRILL BIT

(76) Inventor: Steve Burn, Northampton (GB)

( * ) Notice: Subject to any disclaimer, the term of this patent is extended or adjusted under 35 U.S.C. 154(b) by 818 days.

(21) Appl. No.: 12/679,430

(22) PCT Filed: Sep. 26, 2008

(86) PCT No.: PCT/GB2008/003268
§ 371 (c)(1),
(2), (4) Date: Apr. 23, 2010

(87) PCT Pub. No.: WO2009/040540
PCT Pub. Date: Apr. 2, 2009

(65) Prior Publication Data
US 2010/0196112 A1     Aug. 5, 2010

(30) Foreign Application Priority Data
Sep. 26, 2007 (GB) .................................. 0718758.6

(51) Int. Cl.
B27G 15/00  (2006.01)

(52) U.S. Cl.
USPC ............ 408/211; 408/225; 408/226; 408/230

(58) Field of Classification Search
USPC ................. 408/211, 226, 227, 228, 224, 225, 408/230
See application file for complete search history.

(56) References Cited

U.S. PATENT DOCUMENTS

| | | | | |
|---|---|---|---|---|
| 535,939 A * | 3/1895 | Brearley et al. | | 408/230 |
| 2,689,131 A * | 9/1954 | Priest | | 279/101 |
| 3,920,350 A * | 11/1975 | Southall | | 408/211 |
| 4,199,060 A | 4/1980 | Howard | | |
| 4,491,444 A | 1/1985 | Rumpp et al. | | |
| 5,107,911 A | 4/1992 | Plakotaris | | |
| 5,971,044 A | 10/1999 | Valentin | | |
| 6,095,725 A * | 8/2000 | Stahl | | 408/223 |
| 2005/0224242 A1 | 10/2005 | Britz et al. | | |
| 2005/0271487 A1 * | 12/2005 | Kleine et al. | | 408/226 |

FOREIGN PATENT DOCUMENTS

| | | |
|---|---|---|
| DE | 3613264 A1 | 7/1987 |
| DE | 19848080 A1 * | 4/2000 |
| EP | 0724938 A | 8/1996 |
| EP | 1468790 A | 10/2004 |
| EP | 1769868 A | 4/2007 |
| FR | 2617753 A1 * | 1/1989 |

OTHER PUBLICATIONS

International Search Report for PCT/GB2008/003268 dated Dec. 19, 2008.

* cited by examiner

Primary Examiner — Daniel Howell
Assistant Examiner — Michael Vitale
(74) Attorney, Agent, or Firm — Heslin Rothenberg Farley & Mesiti P.C.

(57) ABSTRACT

A drill bit for drilling holes in wood or the like has a spade cutting element, a thick elongate shaft and a shank adapted to be inserted into an SDS drill chuck. In a preferred embodiment, the shaft is provided with one or more ridges extending helically along most of its length, to strengthen and stiffen the shaft and to direct drilling debris away from the cutting element. The shaft has a diameter greater than or equal to that of the shank. The drill bit may be installed in and removed from the drill chuck more rapidly than conventional wood bits, is more robust and is more convenient and reliable in use.

15 Claims, 4 Drawing Sheets

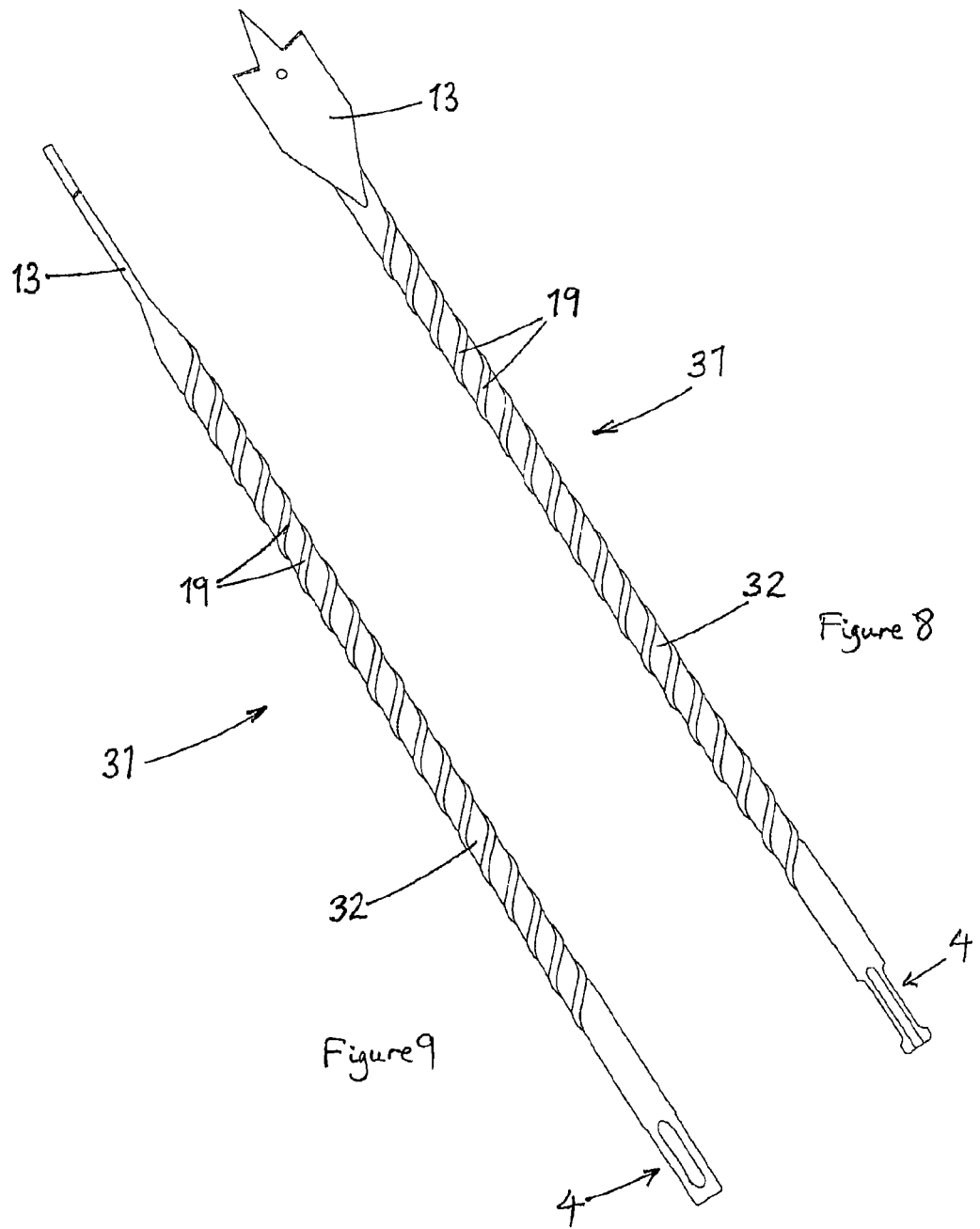

DRILL BIT

CROSS REFERENCE TO RELATED APPLICATIONS

This is a U.S. National Phase application of PCT/GB2008/003268, filed on Sep. 26, 2008 and published in English as WO2009/040540 on Apr. 2, 2009, which claimed priority to GB Application No. 0718758.6, filed on Sep. 26, 2007.

BACKGROUND ART

The present invention relates to a drill bit. More particularly, but not exclusively, it relates to an exchangeable drill bit for use with an electrically-powered hand drill to form holes in wood or similar materials.

It is well known for drill bits to have substantially cylindrical proximal ends adapted to be inserted into a drill chuck. It is also known to provide drill bits that have proximal ends which are non-cylindrical. (The proximal end, known as the 'shank', is the part of a drill bit gripped by the chuck of a drill). Different types of shank/chuck combination deliver different balances of performance, such as allowing higher torque or greater centering accuracy. Known shank types include the brace, straight, hex, triangle and moss taper shaped shanks Many of these are adapted for insertion into complementary drill chucks only.

Traditionally, using a drill bit simply required selecting a shank, which was inserted into a hole in the end of the drill. Over time, various more specialised chuck designs were developed, and modern chucks can grasp and drive some shanks more effectively than others. Such effectiveness is usually quantified in terms of the relative amount of power from the drill motor that is usefully transferred to the bit in the form of actual torque.

It is known, for example from U.S. Pat. No. 4,107,949 and Japanese Patent Application No. 62074510, to provide a shank having what is now known as an "SDS fitting", which is connectable to an "SDS" chuck. (The claimed meaning of the initials SDS varies from manufacturer to manufacturer, and according to the language used). Drill bits having an SDS shank have the advantage that the SDS chuck has a spring-loaded locking mechanism, so that bits can be chucked with a simple and quick hand action. The SDS shank and chuck are particularly suited to hammer drilling in stone and concrete. The drill bit is not held solidly in the chuck, but can slide back and forth longitudinally, like a piston. The hammer of the drill acts to accelerate only the drill bit itself, and not the larger mass of the chuck, which makes hammer drilling with an SDS shank drill bit much more productive than with other types of shank. SDS shanks are therefore widely employed on masonry drill bits for which hammer drilling action is required.

Note: several variants of the SDS chuck design are known, for example under the designations SDS; SDS plus/SDS+; SDS-Top; and SDS-max. The principles of action of these are all substantially the same, the differences mainly being in dimensions and proportions. The term SDS hereinafter should therefore be understood to refer equally to SDS, SDS+, SDS-Top, SDS-max and any other such drill bit connecting arrangement operating on the same principles.

Wood drill bits for forming larger holes, such as the spade or paddle drill bit, are traditionally intended for delicate, careful work in joinery or cabinetmaking, and have simple shanks and thin shafts. They are not designed to undergo high torques or stresses, and have changed little since those bits used with hand-powered drills or in a bit and brace. However, there are many circumstances in which a tradesman or a DIY operator might wish to cut relatively large holes in wood, but with speed being a significant requirement.

It is hence an object of the present invention to provide a drill bit that is suitable for forming holes through wood and similar materials but is easier to fit into a drill and to exchange for another bit than is the case for current wood drill bits. It is also an object to provide such a drill bit that is more robust and more convenient in use than current wood bits.

BRIEF SUMMARY OF INVENTION

According to a first aspect of the present invention, there is provided a drill bit adapted for use with drill means having SDS chuck means, comprising elongate shaft means having at its proximal end shank means engageable with said SDS chuck means and having extending from its distal end a substantially planar cutting element provided with distal cutting edge means extending transversely to a longitudinal axis of the shaft means.

Preferably, said cutting element comprises centring point means extending distally from a midpoint of said cutting edge means.

Said centring point means may divide said cutting edge means into two separate cutting edges.

Said cutting edges may each extend substantially orthogonally to the longitudinal axis of the shaft means.

Alternatively, each cutting edge may extend at an oblique angle to the longitudinal axis, such that each remote end of the cutting edge means is located distally of a portion of the cutting edge means adjacent the centring point means.

The cutting edge means may optionally be provided with distally-extending spur means disposed adjacent each remote end thereof.

Preferably, the cutting element is provided adjacent each cutting edge with indicia adapted to guide regrinding of said cutting edge in the event it becomes blunted.

Said indicia may comprise guideline means extending across a face of the cutting element.

Optionally, the or each guideline means extends parallelly to a respective cutting edge.

Said indicia may comprise a plurality of said guideline means.

Preferably, the shank means is provided with plurality of longitudinally-extending elongate recess means adapted to receive respective engaging elements of an SDS chuck means.

Advantageously, a first said elongate recess means has a closed distal end and extends to an proximal end of the shank means.

A second elongate recess means may have both a closed distal end and a closed proximal end.

The shank means may be provided with two first elongate recess means, extending along substantially diametrically-opposed faces of the shank means.

The shank means may be provided with two second elongate recess means, extending along substantially diametrically-opposed faces of the shank means.

Said first and second elongate recess means may be disposed substantially equiangularly around a circumference of the shank means.

Preferably, the shaft means of the drill bit has a diameter greater than or equal to that of the shank means.

Preferably, the shaft means is provided with helically-extending fluting means.

Advantageously, said fluting means comprises raised rib means extending helically along the shaft means.

Said fluting means may extend along substantially an entire length of the shaft means from the cutting element to the shank means.

The fluting means may thus be adapted to channel drilling debris away from the cutting element.

Additionally or alternatively, the fluting means may be adapted to strengthen and/or stiffen the shaft means.

According to a second aspect of the invention, there is provided a drill bit, adapted for use with a power drill, comprising an SDS shank, and a spade shaped cutting blade extending from a distal end thereof.

The shank is preferably provided with at least one recess and a sliding keyway that is open to the proximal end of the shank so as to be received by an SDS chuck.

Advantageously, the sliding keyway is adapted to mate with coupling keys of the rotational drive, in the chuck.

Preferably, each indentation, or recess is smaller than the sliding keyway.

Advantageously, the recesses are adapted to be grasped by the chuck to prevent the drill bit falling out.

Every recess may not open to the end of the shank.

This ensures that once engaged the shank is held securely by the complimentary keying in the SDS chuck.

The shank may be kept lubricated to allow ease of sliding the shank into the chuck.

Preferably, the shank is adapted to fit directly into an SDS chuck.

This provides an easy and speedy change-over to the required bit format without the risk of the bit slipping while in use.

The shank may have a smaller diameter relative to the boring diameter.

This may provide better coupling when drilling through a surface and allows better transfer of power through torque.

In a preferred embodiment, the cutter is spade-shaped comprising a flat head with a centering point and two cutters, one on each side thereof.

Each cutter may be equipped with spurs.

This enables the cutter to leave a 'cleaner' hole and a smoother interior wall thereof.

Preferably, the drill bit comprises a highly rigid material such as low carbon high tensile steel or tungsten carbide.

The drill bit may be coated with titanium nitride, zirconium nitride, titanium aluminium nitride or diamond powder.

BRIEF DESCRIPTION OF THE DRAWING FIGURES

Embodiments of the present invention will now be more particularly described by way of example and with reference to the accompanying drawings, in which:

FIGS. 8 and 9 are a plan view and a side elevation respectively of a fourth drill bit embodying the present invention.

DETAILED DESCRIPTION

Figures 1, 2:
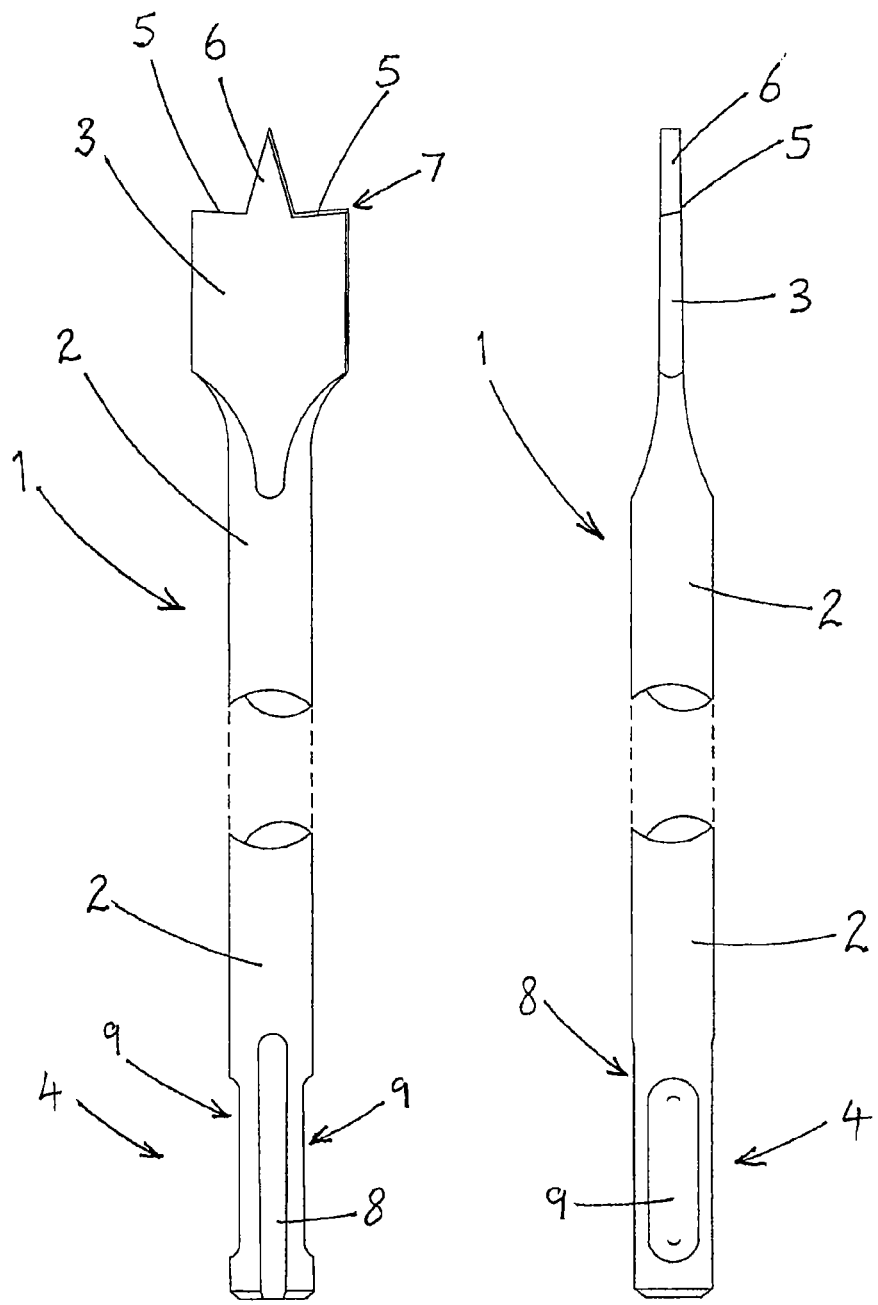
FIG. 1 is a plan view from above of a first drill bit embodying the present invention.
FIG. 2 is a side elevation of the first drill bit of FIG. 1.
Figure 3:
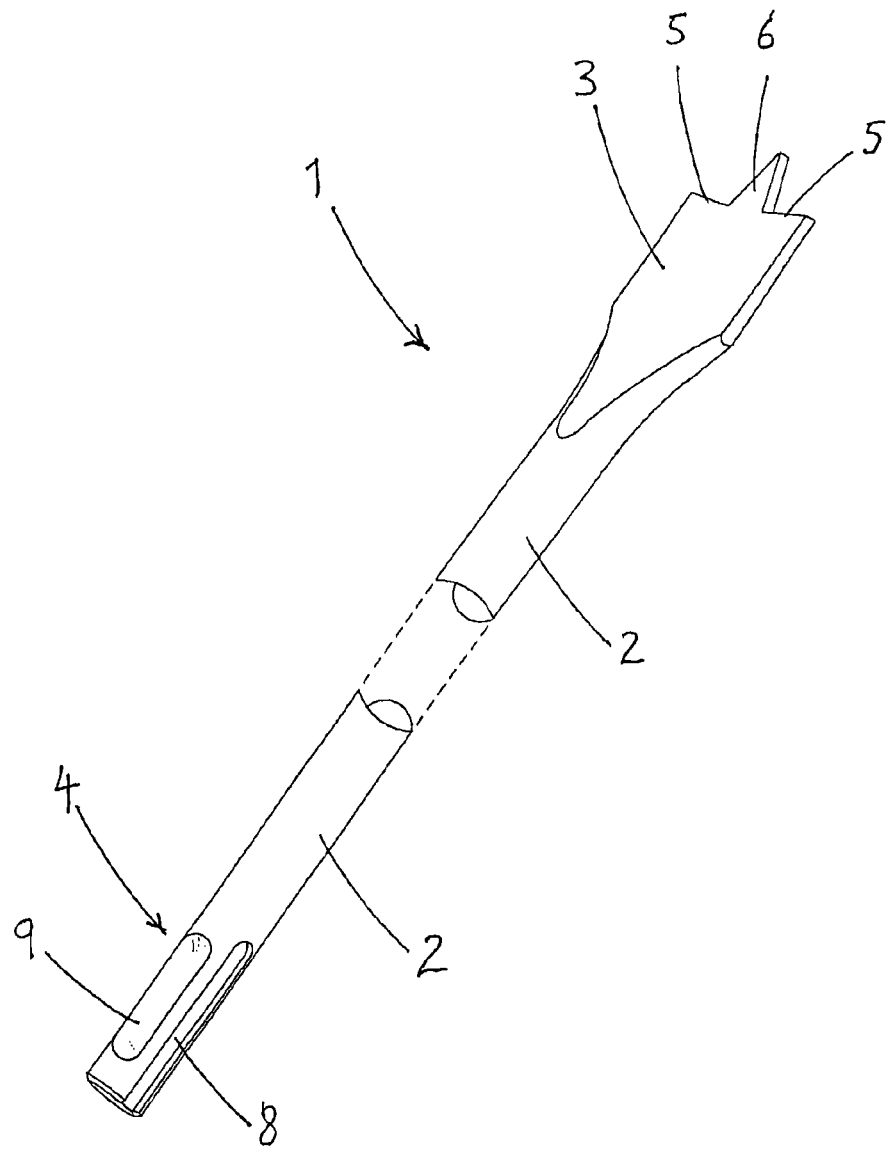
FIG. 3 is an isometric view of the first drill bit of FIG. 1.

Referring now to the Figures and to FIG. 1 in particular, a first drill bit 1 comprises an elongate cylindrical shaft 2 having at a first, distal end a cutting spade portion 3 (or paddle) and at a second, proximal end a shank portion 4 adapted to be received by a drill chuck.

The cutting spade portion 3 has two distal cutting edges 5, one extending to each side of a wedge-shaped centring point 6, which extends distally along a longitudinal axis of the drill bit 1. Each cutting edge 5 extends at a slight angle to a normal to said longitudinal axis, such that its outer tip 7 is raked forwardly (other embodiments, not shown, are provided with small distally-extending spurs at each outer tip 7).

The cutting spade portion 3 thus has similarities with a conventional spade bit or paddle bit, although as shown in FIG. 2 the flat spade portion 3 is made thicker and more robust than a conventional wood bit of the above type.

The shaft 2 is also significantly more robust than for a conventional wood bit, having a diameter slightly greater than that of the shank portion 4.

The shank portion 4 itself is provided with two pairs of elongate, longitudinally-extending recesses 8, 9 which are shaped to cooperate engagingly with gripping elements of an SDS chuck. A pair of first recesses 8 each extend to a proximal end of the shank portion 4, and are located on diametrically-opposite sides of the shank portion 4. A pair of second recesses 9 each have rounded, closed proximal and distal ends. The second pair of recesses 9 are located on diametrically-opposite sides of the shank portion 4, each equally-spaced from the two first recesses 8.

When inserted into an SDS chuck, the first recesses (or keyways) each receive slidingly a respective elongate flange or key of the SDS chuck mechanism. The second recesses 9 each receive a spring-loaded locking element, typically comprising a spaced pair of ball-bearings or the like. This holds the drill bit 1 in position in the chuck longitudinally (NB: SDS masonry bits are usually made to allow slight longitudinal motion relative to the chuck, since they are designed to be used with a hammer action drill; it is possible to make the second recesses 9 shorter than for a conventional SDS-fitting bit, so that there is a more positive location of the locking element in the recess 9 against longitudinal movement, since the bits of the present invention are intended to use without the hammer action of the drill in operation). Meanwhile, the engagement of the keys of the chuck with the first recesses 8 provides a secure torsional grip, and ensures a reliable and effective transmission of torque from the drill to the bit 1.

The spring-loaded locking elements of the SDS chuck allows the shank 4 of the bit 1 simply to be inserted into the chuck until it "clicks home". It is then securely held until a cowling of the chuck is pulled back, disengaging the locking elements and allowing withdrawal of the bit 1 from the chuck. Inserting and removing the bit 1 can thus be a simple, probably single-handed operation, while the bit 1 is held at least as securely as a bit in a conventional keyed or keyless chuck (and probably significantly more securely).

A user needing to create a hole for central heating pipes or electrical cabling, for example through a wooden skirting board, can thus rapidly load the bit 1 of the present invention into an SDS chuck electric drill, drill a hole through the wood, then swap the bit 1 for another required bit with minimal delay. The robust shaft 2 and cutting spade 3 means that the bit 1 can take more punishment than a conventional wood bit which is constructed for low-stress precision carpentry and joinery work. The SDS compatible shank 4 means that the bit 1 is most unlikely to slip in the chuck, whatever torsional loads are imposed on it, whereas conventional chucks do not on the whole grip conventional wood bits very securely.

Figure 4:
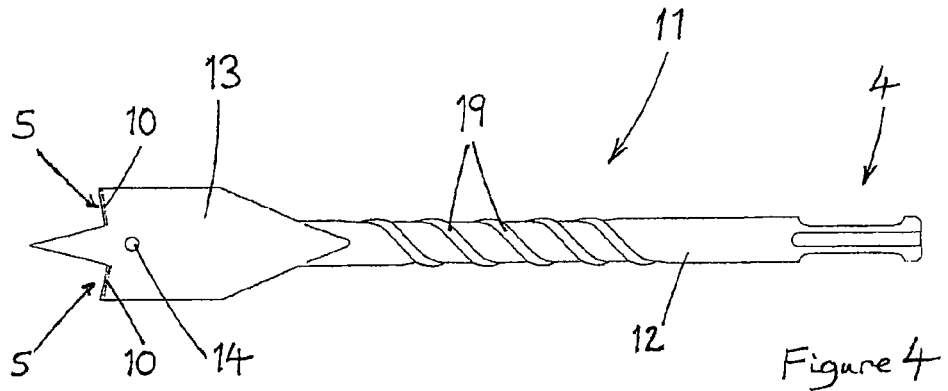
FIGS. 4 and 5 are a plan view and a side elevation respectively of a second drill bit embodying the present invention.
Figure 5:
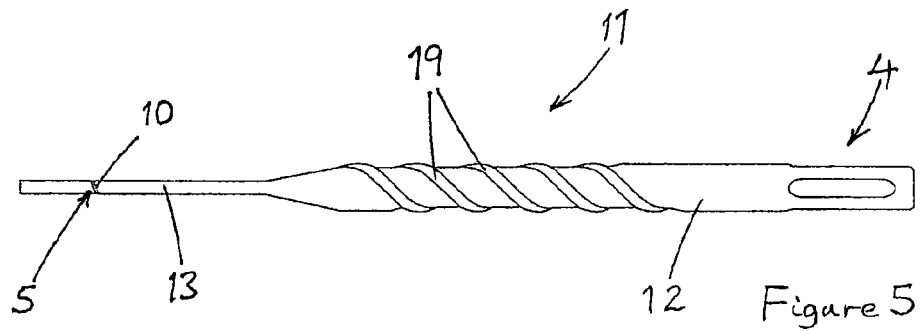

Turning now to FIGS. 4 and 5, a preferred form of drill bit 11 is shown, provided with further beneficial features. This second drill bit 11 has an SDS-chuck compatible shank portion 4 substantially the same as that of the first drill bit 1. Its spade portion 13 is similar to the spade portion 3 of the first drill bit 1, except that it is provided with a set of grinding guide lines 10 extending parallelly to each cutting edge 5. These allow a user to grind a correctly-aligned fresh edge on to the cutting edges 5 if they become blunted or worn down in use, without the use of special setting equipment. The spade portion 13 is also provided with an aperture 14 adapted to receive a guide wire, tape or the like. This allows the second bit 11 to be used to draw wires, etc, along behind a skirting board, panel, etc.

The shaft 12 of the second drill bit 11 is as robust as the shaft 2 of the first drill bit 1, and is also provided with helically-extending upstanding ribs 19 running along a majority of its length. These have two main purposes; they strengthen and stiffen the shaft 12 further, and helps to draw drilling debris away from the cutting spade portion 13, during drilling.

Figure 6:
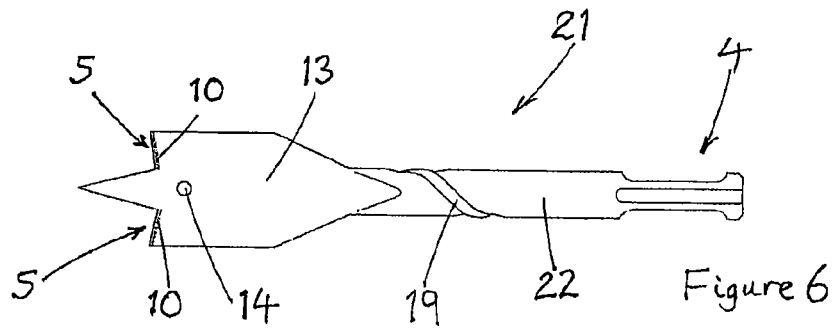
FIGS. 6 and 7 are a plan view and a side elevation respectively of a third drill bit embodying the present invention.
Figure 7:
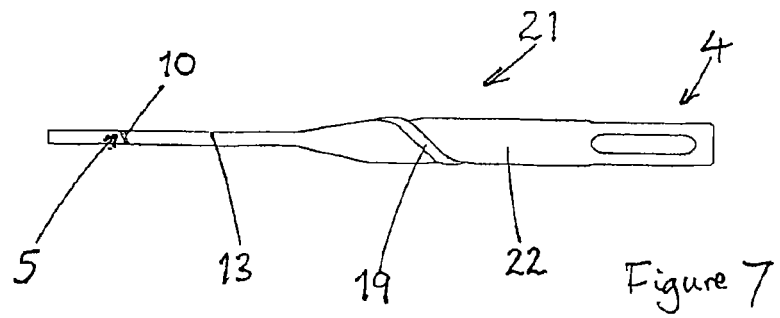

FIGS. 6 and 7 show a third drill bit 21, which is substantially the same as the second drill bit 11, except that its shaft 22 is much shorter (and there is hence only space on the shaft 22 for a single twist of the helical rib 19 in the example shown). The particular example shown has an overall operating length, once its shank 4 is installed in a chuck, of 75 mm or less, as opposed to about 125 mm for the second bit 11. The third bit 21 is hence much easier to manoeuvre in tight corners, as will inevitably be encountered when adding wiring or piping to an existing construction.

FIGS. 8 and 9, on the other hand, show a fourth drill bit 31 that corresponds to the second 11 and third 21 drill bits, except that its shaft 32 is far longer (around 300 mm overall). The robustness of the shaft 32, and the helical rib 19 extending along almost its entire length, mean that such a long bit is still stiff, balanced and accurate in use.

Each of the second, third and fourth drill bits, 11, 21, 31 is envisaged as being produced in a range of cutting diameters. For example, cutting spades 13 may be dimensioned to cut 25 mm holes (as shown) or 18 mm holes, or other sizes as desired.

An alternative drill bit comprises an elongate shank and a spade portion comprising a cutting blade and a centre spur on the centring point. The spade portion has side spurs on either side of a centering point. Each side spur has a thin curved cutting edge running along the inner side of the spur. The elongate shank has a central longitudinal axis and on one end is adapted to engage an SDS drill. The spade portion extends longitudinally from a distal end of the elongate shank, is wider than the elongate shank due to the forging and flattening of the cylindrical bar, and has opposed spaced apart planar faces. Each planar face has a sharp leading shoulder edge. The centre spur extends outwardly from the spade bit along a longitudinal axis and forms a point angle The elongate shank has a sliding keyway that is open to the end of the shank so as to be received by an SDS chuck. Substantially equiangularly-spaced along the longitudinal axis on the opposite side of the keyway are recesses into which the SDS keying couples to lock the shank to the drill.

There is at least one recess to couple with locking keys in the chuck. Each recess is shorter than the sliding keyway measured along the longitudinal axis but wider than the sliding keyway across the shank. The recess does not open to the end of the shank and is adapted to be grasped by the chuck to prevent the drill bit falling out.

The spade bit is formed using a forging process and thereafter grinding and sharpening. Each of the blade bits is generally rectangular in shape. The spade portion is formed by flattening a cylindrical bar of steel. The remainder of the unflattened bar is used to engage the drill by way of a chuck.

The bit blade is preferably produced in a plurality of sizes for drilling holes in a plurality of sizes. For example, a set may consist of ½ inch, ⅝ inch, ¾ inch, ⅞ inch and 1 inch bits.

It should be noted that to use an SDS chuck with non-SDS shaped shanks, it is necessary to use a converter or adapter. Chuck converters are available to enable drill bits without an SDS shank to be used with a drill having an SDS chuck, or conversely, to enable drill bits having an SDS shank to be used with an ordinary drill chuck. However, such a chuck converter usually adds significantly to the effective length of the drill and bit. It therefore becomes harder to manipulate the drill, and to align and engage it correctly, particularly in cramped positions. The presence of the converter prevents use of an SDS drill in hammer action mode. Also, it is time-consuming to tighten or loosen a conventional chuck using chuck keys, during a drilling session, so as to enable the chuck to optimally grasp the shank. A chuck adaptor merely introduces many problems of a conventional chuck into an SDS chuck.

The drill bits of the present invention provide a tradesman, such as an electrician, a plumber or a central heating engineer, with a robust drill bit suitable for rapidly cutting holes through wooden skirting boards, panels and the like. It is much easier and quicker than conventional wood bits to load into the drill as and when required, and can stand up to rougher treatment.

The invention claimed is:

1. A drill bit adapted for use with a drill having an SDS chuck, comprising an elongate shaft having, at a proximal end, a shank engageable with said SDS chuck and having extending from a distal end a substantially planar cutting element provided with a distal cutting edge extending transversely to a longitudinal axis of the shaft wherein said shaft is provided with helically-extended fluting comprising a raised rib extending helically along the shaft.

2. A drill bit as claimed in claim 1, wherein said cutting element comprises a centering point element extending distally from a midpoint of said cutting edge.

3. A drill bit as claimed in claim 2, wherein said centering point element divides said cutting edge into two separate cutting edges.

4. A drill bit as claimed in claim 3, wherein each cutting edge extends at an oblique angle to the longitudinal axis, such that each remote end of the cutting edge is disposed distally of a portion of the cutting edge adjacent the centering point element.

5. A drill bit as claimed in claim 3, wherein the cutting element is provided adjacent each cutting edge with indicia adapted to guide regrinding of said cutting edge in the event the cutting edge becomes blunted.

6. A drill bit as claimed in claim 1, wherein the shank is provided with plurality of longitudinally-extending elongate recesses adapted to receive respective engaging elements of an SDS chuck.

7. A drill bit as claimed in claim 6, wherein a first said elongate recess has a closed distal end and extends to a proximal end of the shank.

8. A drill hit as claimed in claim 6, wherein a second said elongate recess has both a closed distal end and a closed proximal end.

9. A drill bit as claimed in claim 6, wherein the shank is provided with two first elongate recesses, extending along substantially diametrically-opposed faces of the shank.

10. A drill bit as claimed in claim 6, wherein the shank is provided with two second elongate recesses, extending along substantially diametrically-opposed faces of the shank.

11. A drill bit as claimed in claim 1, wherein the shaft of the drill bit has a diameter greater than or equal to that of the shank.

12. A drill bit as claimed in claim 1, wherein said fluting extends along substantially an entire length of the shaft from the cutting element to the shank.

13. A drill bit as claimed in claim 5, wherein said indicia comprises guideline elements extending across a face of the cutting element.

14. The drill bit as claimed in claim 1, wherein the cutting element includes an aperture extending transversely of the longitudinal axis.

15. The drill bit as claimed in claim 1, in combination with an electrically powered hand drill.

* * * * *